United States Patent [19]

Earsley et al.

[11] 4,019,790
[45] Apr. 26, 1977

[54] BALL SEPARATOR FOR BALL BEARINGS

[76] Inventors: Melvin L. Earsley; Stephen L. Earsley; James L. Earsley, all of 616 E. Slaton Road, Lubbock, Tex. 79404

[22] Filed: Apr. 22, 1976

[21] Appl. No.: 679,138

[52] U.S. Cl. .............................. 308/201; 308/217
[51] Int. Cl.² ...................................... F16C 19/20
[58] Field of Search .......................... 308/201, 217

[56] References Cited

UNITED STATES PATENTS

| 1,814,993 | 7/1931 | Wickland | 308/201 |
| 2,407,388 | 9/1946 | Smith et al. | 308/201 |
| 2,861,849 | 11/1958 | Case | 308/201 |
| 2,911,268 | 11/1959 | Staunt | 308/201 |
| 3,157,443 | 11/1964 | Draudt | 308/201 |

OTHER PUBLICATIONS

Nylo–Cage Bearing Retainers, of Industrial Molding Corporation.

Primary Examiner—Robert R. Song
Assistant Examiner—Gene A. Church
Attorney, Agent, or Firm—Peter J. Murphy

[57] ABSTRACT

A primarily radial load ball bearing includes an assembly of outer and inner race rings having confronting raceways for a plurality of balls and a unitary ball separator fabricated of a moldable resilient material, having an annular base and annularly spaced fingers defining an interrupted cylindrical rib which projects between the outer and inner race rings and provides pockets for confining each of the balls of the bearing. Each finger defines a pedestal supporting at least two ears which are integral extensions of the pedestal and which are radially separated from each other. One ear extends into one adjacent pocket, and the other ear extends into the opposite adjacent pocket. The distance between the confronting distal lips of the ears for one pocket is less than the diameter of the ball, so that the ears define a snap-in entry to the pocket. The ears, then, are designed to be resiliently yieldable relative to the supporting pedestals. In alternative design each finger pedestal may support three radially spaced ears, so that the ears associated with a respective pocket are symmetrical relative to a plane including the spherical center of the pocket. The design enables the maximum complement or capacity of balls with each pocket providing a snap-in entry.

15 Claims, 9 Drawing Figures

BALL SEPARATOR FOR BALL BEARINGS

BACKGROUND AND SUMMARY OF THE INVENTION

This invention relates to ball separators for use in ball bearings; and more particularly to one piece ball separators for use in maximum complement ball bearings, and which separators have means for retention on each of the balls of the bearings. The term "ball separator" refers to a component of a ball bearing assembly which is also commonly known by the names "ball retainer" and "bearing cage."

Ball separators which are fabricated from moldable nonmetallic material, such as heat stabilized nylon, are known for use in conventional conrad type ball bearings; and these ball separators provide ball pockets defined by annularly spaced fingers, with each finger including two integral annularly spaced ears which project into adjacent pockets and are flexible to provide a "snap-in" entry for each pocket.

A maximum complement ball bearing contains many more balls than a conventional conrad type of ball bearing of comparable size, for carrying a higher load. In these maximum complement ball bearings, it is desirable that the ball separator have means for retention on each of the balls of the bearings; however, this is not possible with separator designs used with conrad type bearings because of space limitations.

One approach to providing a ball separator for maximum complement bearings, embodying generally the above described design for conrad type bearings, is to merely eliminate the ears for alternate pockets since there is insufficient space on the fingers for the described annularly spaced ears. While separators of this design may function satisfactorily, the bearing is unbalanced in the sense that each of the balls does not have the identical structural relationship to the other elements of the bearing assembly. Furthermore, a limitation of this design is that it is not suitable for bearing assemblies having an odd number of pockets and balls; since this would necessitate further unbalancing, requiring, at some point, two adjacent pockets which do not have ball retention ears. A further disadvantage of this is lesser retention of the separator on the several balls of the bearing, which may allow the separator to pop out of the bearing assembly under certain load conditions.

A principal object of this invention therefore is to provide a one piece ball separator for maximum complement ball bearings, having retention means for each of the balls of the bearing.

Another object of this invention is to provide such a one piece ball separator for bearings, which is capable of being molded from a suitable material by economic molding techniques.

A further object of this invention is to provide such a moldable ball separator which enables the economic building of a mold for the fabrication thereof.

Still another object of this invention is to provide a one piece ball separator particularly useful in maximum complement bearings, having ball retaining ears which are sufficiently rugged and flexible for retaining balls in each of the pockets.

These objects are accomplished in a ball separator for use in a ball bearing which includes an outer race, an inner race, and a plurality of balls coacting with the outer and inner races. The ball separator includes an annular base, a plurality of annularly spaced fingers projecting generally axially from said base to define an interrupted annular rib which is adapted to be received between the outer and inner races of the ball bearing assembly, with the rib fingers defining individual annularly spaced ball enclosing pockets. The improvement in the ball separator is that each of the fingers comprises a pedestal for at least two independently flexing ears which are integral extensions of the pedestal, with these at-least-two ears being radially separate and partially overlapping. The distal ends of at least two of the ears on each pedestal project away from each other into the two adjacent pockets, whereby each pocket is partially defined by the reentrant ears of its associated fingers.

More particularly the fingers project axially from the base, defining a cylindrical rib; with the base defining a base plane transverse to the axis of the ball separator and said pedestals terminating in a plane parallel to the base plane; and said ears having flat tips disposed in a plane parallel to the base and pedestal plane. The confronting lips of the ears for each pocket, at the distal ends, may be sharp, beveled or contoured.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figure 1:
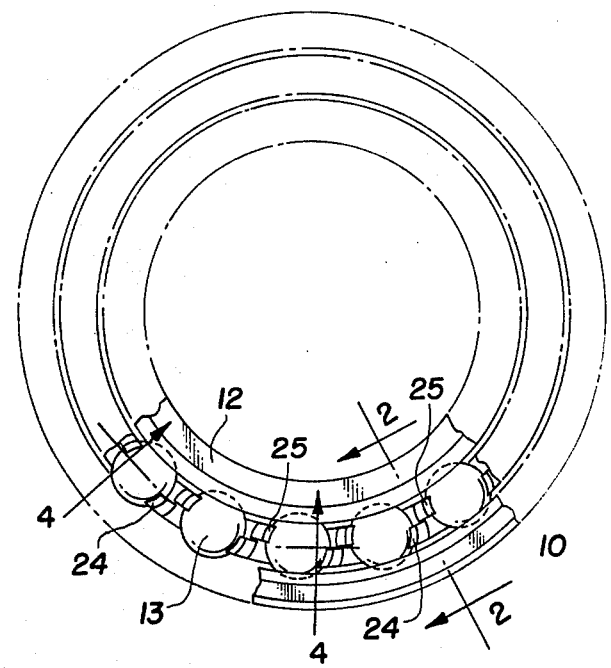
FIG. 1 is a plan view of a bearing assembly including a ball separator according to the invention.

In the drawings and in the following specification, there is described, by way of example, a ball bearing designed for primarily radial loads; and the ball separators illustrated and described for use in such bearing are preferred forms of ball separators according to the invention. It is to be understood however that ball separators according to the invention could be designed for use in other types of bearings such as so-called angular contact ball bearings which are designed to support substantial axial thrust loads as well as radial loads. The claims presented in this application are not intended to be limited to primarily radial load bearings, except where the claim language clearly recites such structure.

EMBODIMENTS OF FIGS. 1 THROUGH 6

Figure 2:
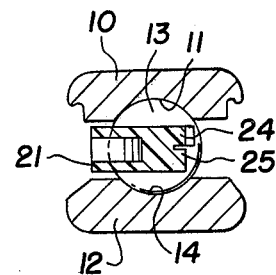
FIG. 2 is a transverse sectional view of the assembly taken in the plane 2—2 of FIG. 1.

Referring now particularly to FIGS. 1 and 2 of the drawing, the ball bearing assembly includes: an outer race ring 10, hereafter sometimes referred to as an outer race, which is a generally cylindrical ring having an arcuate raceway or groove 11 on its inner wall; an inner race ring 12, hereafter sometimes referred to as an inner race, having an arcuate raceway or groove 14 on its outer wall; with these inner and outer races and the associated raceways being so dimensioned to confine the bearing balls 13 when in assembled relation. In a maximum complement bearing assembly, with which this invention is concerned, it would very likely be necessary to provide a loading groove in one or both of the races 10 and 12 for the purpose of enabling the ingress of balls into the bearing assembly. The inner and outer races and the bearing balls are fabricated from suitable bearing metals as are well known. A ball separator 20, as its name implies, performs the function of separating the several balls 13 from each other in the ball bearing assembly; and for this purpose provides annularly spaced pockets for the balls 13. In a separator according to the invention, each of the pockets includes means for retention on its respective ball, to provide for maximum retention of the separator in the bearing assembly. The ball retainer 20, according to the invention, is a unitary member fabricated from a suitable material, capable of being molded by a suitable technique such as injection molding. One appropriate material is a heat stabilized nylon material, which is properly annealed and stabilized for bearing applications.

Referring particularly to FIGS. 1 through 4 of the drawings, the ball separator 20 is an annular member including a continuous base 21, defining a base plane which is perpendicular to the central axis of the ball separator, and including a plurality of annularly spaced fingers 22 which extend axially from the base 21 and effectively define an interrupted annular rib which is received between the inner and outer races 10 and 12. The separator base and fingers have common inner and outer cylindrical wall surfaces, providing a wall thickness which is considerably less than the diameter of the balls 13; and it is the fingers 22 and associated structure which define the pockets 26 which, in this embodiment, have spherical wall surfaces for the respective balls 13.

Figure 3:
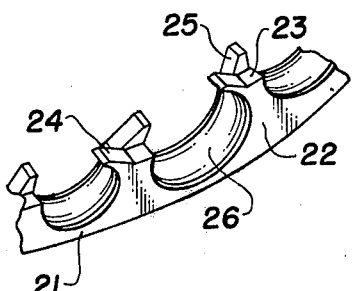
FIG. 3 is a fragmentary perspective view of the ball separator of the FIG. 1 assembly.
Figure 4:
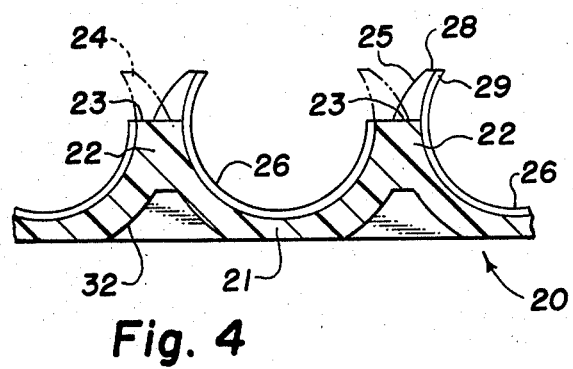
FIG. 4 is a sectional view of the ball separator of FIG. 1 as viewed from the cylindrical projection 4—4 of FIG. 1.

Each of the fingers 22 defines a pedestal portion 23 for a plurality of radially separated ears, with respective outer and inner ears 24 and 25 being illustrated in FIGS. 1 through 4. The pedestal is identified in the drawings by its terminal surface 23, and these pedestal surfaces 23 for all of the fingers are disposed in a common plane which is parallel to the plane of the base. As illustrated in FIG. 4, this plane of the pedestals 23 is preferably disposed slightly above the parallel plane which would be defined by the centers of the spherical ball pockets 26. The ears 24 and 25 project independently from and are preferably radially separated on the pedestals. As seen, the outer ears 24 have outer wall surfaces which are common with the outer wall surfaces of the fingers, and the inner ears 25 have inner wall surfaces in common with the inner wall surface of the fingers; and the inner and outer ears having confronting, slightly spaced faces which are essentially parallel with the above mentioned opposite faces.

For the ball separator 20 illustrated in FIGS. 1 to 4, each of the outer ears 24 projects from the pedestal in the same annular direction into its associated adjacent pocket (in a clockwise direction as viewed from the top in FIG. 1); while each of the inner ears 25 projects in the opposite annular direction into its adjacent respective pocket, this relationship being best seen in FIG. 3. For this ball separator then, each of the fingers 22 is identical, and this design is suitable for ball bearings with either an even or odd number of pockets. Also for this reason, the mold design and building may be more economic.

Referring to further structural details of the ears 24 and 25, as best seen in FIG. 4 the distal ends of the ears have flat tips 28; and these tips 28 are disposed in a common plane which is parallel to the planes of the pedestals and of the base. It will also be seen that the ear tips 28 and spherical walls 26 define confronting relatively sharp arcuate lips 29. Alternative forms of ears and confronting lips will be described subsequently. The diametral distance between the confronting lips 29 for one pocket, is less than the diameter of the bearing ball 13 to be received in the pockets, so that these ears define a snap-in entry for the balls into the pockets 26; and for this purpose of course the ears must be flexible and elastically yielding relative to the associated pedestal 23. It is for this reason of course that the ears which are common to one pedestal 23 are radially separate as described.

Figure 5:
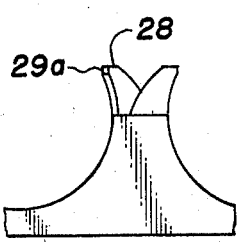
FIG. 5 is a fragmentary elevation view of one finger of a bearing assembly similar to that of FIG. 1, having a slightly modified form of ear.

FIG. 5 illustrates a similar separator with ears of alternative form, including flat distal tips 28, but wherein the confronting lips 29a are flatted or beveled to relieve the relatively sharp lip; and these confronting lip surfaces 29a may be generally cylindrical and perpendicular to the base.

Figure 6:
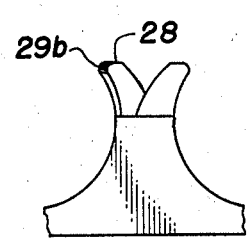
FIG. 6 is a fragmentary elevation view of one finger of a bearing assembly similar to that of FIG. 1, having another modified form of ear.

FIG. 6 illustrates another similar separator with alternative form of ear, again including a flat distal tip 28, but wherein the confronting lips 29b are rounded or contoured merging with the lips 28 and the spherical walls 26. Also the ears may be fully rounded or contoured, as will be described in connection with FIGS. 7, 8 and 9.

The bottom surface of the separator base 21 may be provided with recesses 32 at each pedestal, for eliminating unnecessary material without impairing the desirable structural strength of the ball separator.

EMBODIMENTS OF FIGS. 7, 8 AND 9

Figure 7:
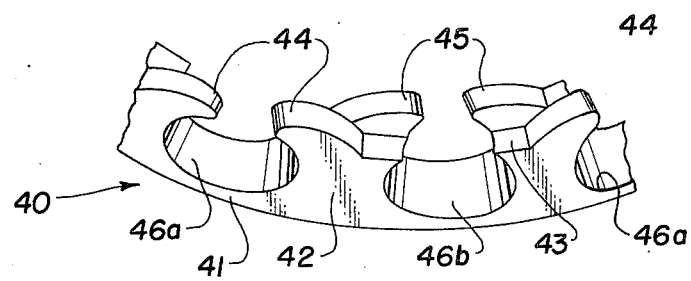
FIG. 7 is a fragmentary perspective view similar to FIG. 3, illustrating an alternative form of ball separator which includes cylindrical pockets about radial axes, and which includes another alternative form of ear and an alternative arrangement of the ears on the respective pedestals.
Figure 8:
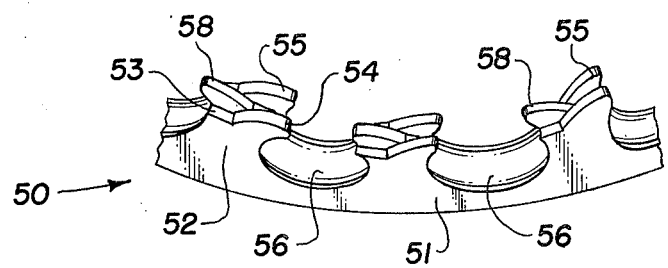
FIG. 8 is a fragmentary perspective view similar to FIG. 3, of another alternative form of ball separator which includes another arrangement of ears on the respective pedestals.
Figure 9:
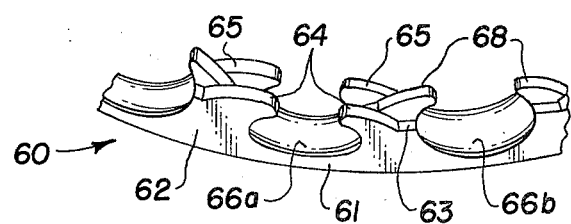
FIG. 9 is a fragmentary perspective view similar to FIG. 3, of still another alternative form of ball separator which includes another alternative arrangement of ears on the respective pedestals.

In the rings which are illustrated in FIGS. 7, 8 and 9, to be described, the distal ends of the ears are shown as contoured tips which merge with the pocket face of the ear and with the opposite face of the ear. These contoured ears of FIGS. 7, 8 and 9, then, are different from the ears of the illustrated separator 20 which include the surfaces 29 and 29. It is applicants' belief that, from the standpoint of building a mold for the injection molding of separators according to the invention, the ear configurations for the ball separator illustrated in FIGS. 1 through 5 are preferable to a fully contoured ear configuration, in that the mold would be easier to design and build. A difficulty with the contoured ears is that the radius of the tip must be blended into the radius of the pocket face of the ear on the one hand and with the radius of the opposite face of the ear on the other; and this increases the complexity and expense of mold building.

FIGS. 7, 8 and 9 of the drawing illustrate alternative configurations of ball separators according to the invention, principally with resepct to the number and arrangement of the ears; and in these embodiments the ears are illustrated as fully contoured ears. It should be understood that, for each embodiment, the ears might have alternative configurations as illustrated in FIGS. 4, 5 or 6.

FIG. 7 illustrates a ball separator 40, identical to the ball separator 20 in the configuration of its base 41 and pedestals 43, and similar to the retainer 20 in that each finger 42 has outer and inner ears 44 and 45. This separator differs from the separator 20 in that the ears which define alternate pockets 46a are confronting outer ears 44, while the ears which define the intervening alternate pockets 46b are confronting inner ears 45. From the standpoint of mold design, two different forms of fingers 42 must be provided; and this assumes that the number of pockets would be an even number.

FIG. 7 illustrates another difference in structure from the other embodiments, namely that the wall surfaces of the pockets 46a and 46b are cylindrical rather than spherical, with the axes of the cylindrical pockets being radial. This illustrates an alternative form of pocket wall configuration for separators according to the invention.

FIG. 8 illustrates another alternative form of ball separator 50, which is identical to the ball separator 20 in the configuration of the base 51 and pedestal 53 and in that the pockets 56 are defined by spherical surfaces. This configuration differs in that three radially spaced ears are provided on each pedestal 53, including respective outer and inner ears 54 and 55 and an intermediate ear 58. In this configuration the respective outer and inner ears 54 and 55 for all fingers 52 extend in the same annular direction into associated pockets (counter clockwise as viewed from the top in FIG. 8), while the intermediate ear 58 for each finger extends in the opposite direction. Each pocket 56 then is partially defined by a pair of outer and inner ears 54 and 55 at one side and a single intermediate ear 58 on the opposite side, the pocket defining fingers then are symmetrical with respect to the pocket center. In this separator 50, as with the separator 20, each finger is identical from the standpoint of the mold to produce it; and this design is suitable regardless of the number of pockets.

A further modified form of separator 60 is illustrated in FIG. 9, again being identical to the other described separators in the configuration of its base 61, pedestal portion 63 of its fingers 62 and in the provision of pockets 66a and 66b with spherical surfaces. The pedestals for the separator 60 also include three radially spaced ears including outer ear 64, inner ear 65 and intermediate ear 68. In this configuration, for alternate pockets 66a the respective outer and inner ears 64 and 65 of the adjacent fingers 62 project toward each other to partially define the pockets and accordingly there are four ears which define these pockets 66a. For the intervening alternate pockets 66b it is only the intermediate ears 68 which project toward each other to partially define these pockets. In this separator, as with the separator 50, each pocket has ears defining a snap-in entry and the ears are symmetrical relative to the center of the pockets 66a and 66b. However, in common with the separator 40, from the standpoint of mold building this separator requires two different forms of fingers, again assuming that the number of pockets is an even number.

FEATURES AND ADVANTAGES

What has been described are several embodiments of an improved ball separator, for use in a maximum complement ball bearing assembly, wherein the separator provides means for retention on each of the balls of the bearing assembly. A particular advantage of this arrangement is that it provides for maximum retention of the separator within the assembly, which is desirable for bearing assemblies subject to certain load conditions. Certain loads imposed on the bearing will tend to pop the separator out of the bearing; and if the load is high enough this could actually occur. With a separator designed for retention on each ball, this means that the retention force can be less for each of the pockets while the overall retention force of the separator as a whole is greater; or it means that the overall retention force may be increased to the value that cannot be achieved in a separator which does not have this feature. Another advantage is that the separator will be a balanced design, whether it includes an even number or an odd number of pockets. As mentioned, if there are an odd number of pockets, with ears provided only for alternate pockets the separator is inherently unbalanced. Such unbalance produces vibration in the separator and this in turn produces vibration in the inner race. Accordingly, with a balanced design according to this invention the bearing assembly will operate smoother and with less vibration.

Still another advantage of this feature is that the ball separators can have identical overall design for all sizes of bearings, independent of the number of ball pockets in the separator.

Several different forms or embodiments of separators have been described; some being more suitable from the standpoint that all of the fingers are identical resulting in economy of mold design; some being more suitable in that fewer ears are provided resulting in economy of mold design; some being more suitable in that the ears are symmetrical relative to the ball socket centers, which may be a more suitable functional design.

A feature of the invention is a particular ear design providing simple intersect surfaces which simplify mold design.

A principal advantage of the invention is that it permits use of a proven design of ball separator, but accomodated for maximum complement ball bearings, and yet provides the function of retention on each of the balls of that maximum complement bearing.

While preferred embodiments of the invention have been illustrated and described, it will be understood by those skilled in the art that changes and modifications may be resorted to without departing from the spirit and scope of the invention.

What is claimed is:

1. A ball separator for use in a ball bearing which includes an outer race, an inner race, and a plurality of balls coacting with said outer and inner races; said ball separator including an annular base, a plurality of annularly spaced fingers projecting generally axially from said base defining an interrupted annular rib adapted to be received between the outer and inner races of said ball bearing assembly, said rib fingers defining individual annularly spaced ball enclosing pockets; the improvement comprising each of said fingers comprising a pedestal for at least two independently flexing ears which are integral extensions of the pedestal; said at-least-two ears being radially separate and partially overlapping, and with the distal ends thereof projecting axially from the pedestal and into respective adjacent pockets, whereby each pocket is partially defined by reentrant ears of its associated fingers.

2. A ball separator as set forth in claim 1 further comprising said pockets being defined by spherical surfaces.

3. A ball separator as set forth in claim 1 further comprising cylindrical surfaces generated about radial axes.

4. A ball separator as set forth in claim 1 further comprising said separator base defining a base plane perpendicular to the central axis of said ball separator; said pedestals terminating in a common plane parallel to said base plane; and said ear distal ends terminating in a common plane parallel to said base plane.

5. A ball separator as set forth in claim 4 further comprising said distal ends of said ears having flat tips disposed in said common end plane.

6. A ball separator as set forth in claim 4 further comprising said distal ends of said ears having contoured tips disposed in said common end plane.

7. A ball separator as set forth in claim 4 further comprising said distal ends of said reentrant ears for each pocket defining confronting lips; said confronting lips being beveled to define faces generally perpendicular to said base plane.

8. A ball separator as set forth in claim 4 further comprising said distal ends of said reentrant ears for each pocket defining confronting lips;

said confronting lips being sharp.

9. A ball separator as set forth in claim 4 further comprising said distal ends of said reentrant ears for each pocket defining confronting lips;

said confronting lips being contoured.

10. A ball separator as set forth in claim 1 further comprising said separator base and rib having common inner wall surfaces and common outer wall surfaces; one of said ears for each pedestal having an outer wall surface common with said outer separator wall surface, and another of said ears having an inner wall surface common with said inner separator wall surface;

each finger including two of said ears; said ears coincident with said outer wall surface projecting toward respective pockets in a common annular direction; and said ears coincident with said inner wall surface projecting toward respective pockets in the opposite annular direction.

11. A ball separator as set forth in claim 1 further comprising said separator base and rib having inner wall surfaces and common outer wall surfaces; one of said ears for each pedestal having an outer wall surface common with said outer separator wall surface, and another of said ears having an inner wall surface common with said inner separator wall surface;

each finger including two of said ears; the reentrant ears for alternate pockets being coincident with said outer separator wall surface; and the reentrant ears for said intervening alternate pockets being coincident with said inner separator wall surface.

12. A ball separator as set forth in claim 1 further comprising said separator base and rib having common inner wall surfaces and common outer wall surfaces; one of said ears for each pedestal having an outer wall surface common with said outer separator wall surface, and another of said ears having an inner wall surface common with said inner separator wall surface;

each of said fingers including three of said ears; the inner and outer ears of each finger being coincident respectively with said inner and outer separator wall surfaces and projecting toward the same pocket, and the intermediate ear of each finger projecting toward the opposite pocket.

13. A ball separator as set forth in claim 12 further comprising each of said fingers being identical, with said respective inner and outer ears projecting in a common annular direction, and with said respective intermediate ears projecting in the opposite annular direction.

14. A ball separator as set forth in claim 12 further comprising alternate ball pockets of said separator being partially defined by confronting pairs of inner and outer ears of the adjacent fingers; and the intermediate alternate ball pockets being partially defined by the confronting intermediate ears of the adjacent fingers.

15. A ball separator as set forth in claim 1 further comprising said separator base and rib having common inner and outer concentric cylindrical walls, with said base defining a planar base surface perpendicular to said cylindrical walls; said fingers projecting axially from said base with said pedestals terminating in a plane parallel to said base surface plane;

one of said ears for each pedestal having an outer wall common with said outer cylindrical wall, and another of said ears having an inner wall common with said inner cylindrical wall, and said ears having confronting walls generally concentric with said separator inner and outer walls.

* * * * *